(12) United States Patent
Butlin, Jr. et al.

(10) Patent No.: US 9,463,746 B2
(45) Date of Patent: Oct. 11, 2016

(54) MULTI-PANEL HINGED ENDGATE ASSEMBLY WITH EDGE SUPPORT FOR STEP PANEL

(71) Applicant: GM GLOBAL TECHNOLOGY OPERATIONS LLC, Detroit, MI (US)

(72) Inventors: Albert H. Butlin, Jr., Birmingham, MI (US); Paul R. Messina, West Bloomfield, MI (US); James G. Gobart, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 14/489,001

(22) Filed: Sep. 17, 2014

(65) Prior Publication Data
US 2016/0075286 A1 Mar. 17, 2016

(51) Int. Cl.
*B60R 3/00* (2006.01)
*B60R 3/02* (2006.01)
*B62D 33/027* (2006.01)
*B62D 33/03* (2006.01)

(52) U.S. Cl.
CPC ............. *B60R 3/02* (2013.01); *B62D 33/0273* (2013.01); *B62D 33/03* (2013.01)

(58) Field of Classification Search
CPC ....... B60R 3/00; B60R 3/02; B62D 33/0273; B62D 33/03
USPC .......................................................... 296/62
See application file for complete search history.

(56) References Cited

U.S. PATENT DOCUMENTS 8,201,869 B1 6/2012 Butlin, Jr. et al.
8,348,325 B2 * 1/2013 Hausler .............. B62D 33/0273
296/51

* cited by examiner

*Primary Examiner* — Joseph D Pape
(74) *Attorney, Agent, or Firm* — Quinn Law Group, PLLC (57) ABSTRACT

An endgate assembly includes a first panel that has a first hinge axis, a second panel hinged to the first panel at a second hinge axis that is spaced from and generally parallel with the first hinge axis, and a third panel hinged to the second panel at a third hinge axis and pivotable about the third hinge axis from a stowed position generally parallel with the second panel to a use position generally perpendicular to the second panel. The third panel has a proximal portion and a distal portion. The proximal portion and the distal portion are divided by the third hinge axis. The second panel has a recess adjacent the third hinge axis that receives the proximal portion and has a first surface at the recess positioned to establish the use position of the third panel by contacting the proximal portion and reacting loading of the distal portion.

20 Claims, 6 Drawing Sheets

MULTI-PANEL HINGED ENDGATE ASSEMBLY WITH EDGE SUPPORT FOR STEP PANEL

TECHNICAL FIELD

The present teachings generally include a vehicle endgate assembly and a vehicle having an endgate assembly.

BACKGROUND

An endgate assembly is sometimes provided on a vehicle, such as a pickup truck, as a means of selectively closing off or allowing access to a cargo area, such as a truck bed. Typically, a truck bed is accessed by opening a pivotable endgate assembly at the rear of the truck bed.

SUMMARY

An endgate assembly for connection to a vehicle body includes a first panel, a second panel, and a third panel. The first panel has a first hinge axis at which the first panel may be pivotable from a closed position to an open position when connected to the vehicle body. The second panel is hinged to the first panel at a second hinge axis that is spaced from and generally parallel with the first hinge axis. The second panel is pivotable about the second hinge axis from a first position generally parallel with the first panel to a second position generally perpendicular to the first panel. The third panel is hinged to the second panel at a third hinge axis and pivotable about the third hinge axis from a stowed position generally parallel with the second panel to a use position generally perpendicular to the second panel.

The third panel has a proximal portion and a distal portion. The proximal portion and the distal portion are divided by the third hinge axis. The second panel has a recess adjacent the third hinge axis that receives the proximal portion when the third panel is pivoted to the use position. The second panel has a first surface at the recess positioned to establish the use position of the third panel by contacting the proximal portion and reacting loading of the distal portion, thereby preventing further pivoting of the third panel about the third hinge axis. In other words, the second panel supports the third panel at the proximal portion, near an edge of the third panel. A load applied to the third panel, such as when the third panel is used as a step, is reacted fully by the first surface. In one embodiment, the third panel is supported by the second panel when in the use position without any latch assemblies, linkages, cables, support arms, straps, ropes, chains, struts or other components other than a hinge assembly. User access to the distal portion of the third panel is thus unobstructed. The number of components, assembly time, and complexity of the endgate assembly is also reduced.

The endgate assembly allows easier access to the cargo area by reducing the overall height of the endgate assembly when the first panel is in the closed position and the second panel is pivoted to the second position. The endgate assembly can be configured to provide two-tier loading. Furthermore, the third panel can be positioned to potentially reduce aerodynamic drag.

The above features and advantages and other features and advantages of the present teachings are readily apparent from the following detailed description of the best modes for carrying out the present teachings when taken in connection with the accompanying drawings.

DETAILED DESCRIPTION

Figure 1:
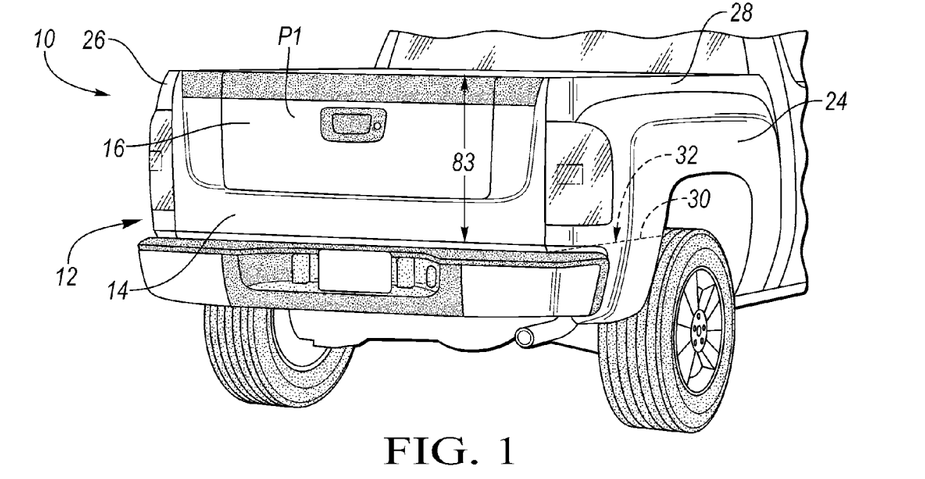
FIG. 1 is a schematic illustration in fragmentary perspective view of a vehicle with an endgate assembly in accordance with the present teachings.
Figure 3:
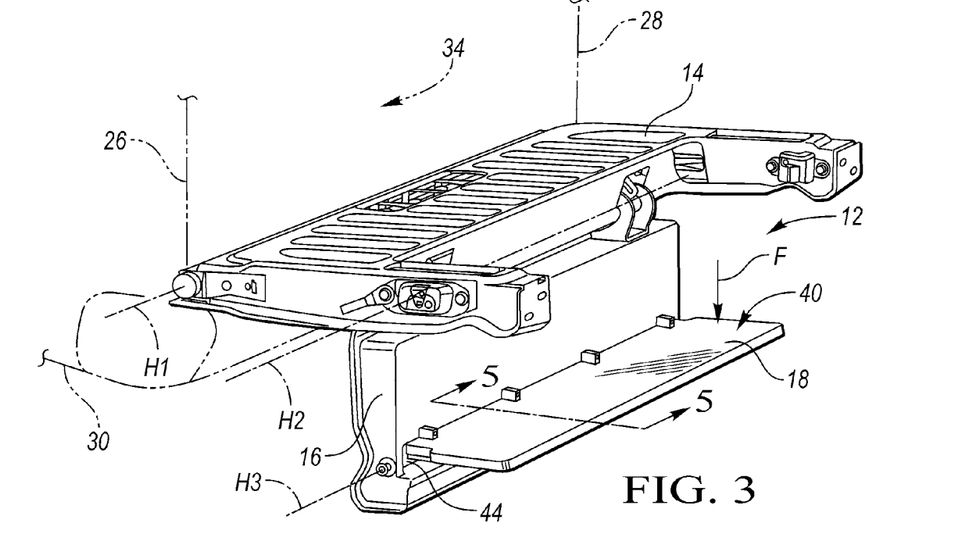
FIG. 3 is a schematic illustration in perspective view of the endgate assembly of FIG. 1 showing a body of the vehicle in partial phantom view, with the first panel in the open position, the second panel in the second position, and a third panel in a use position.
Figure 5:
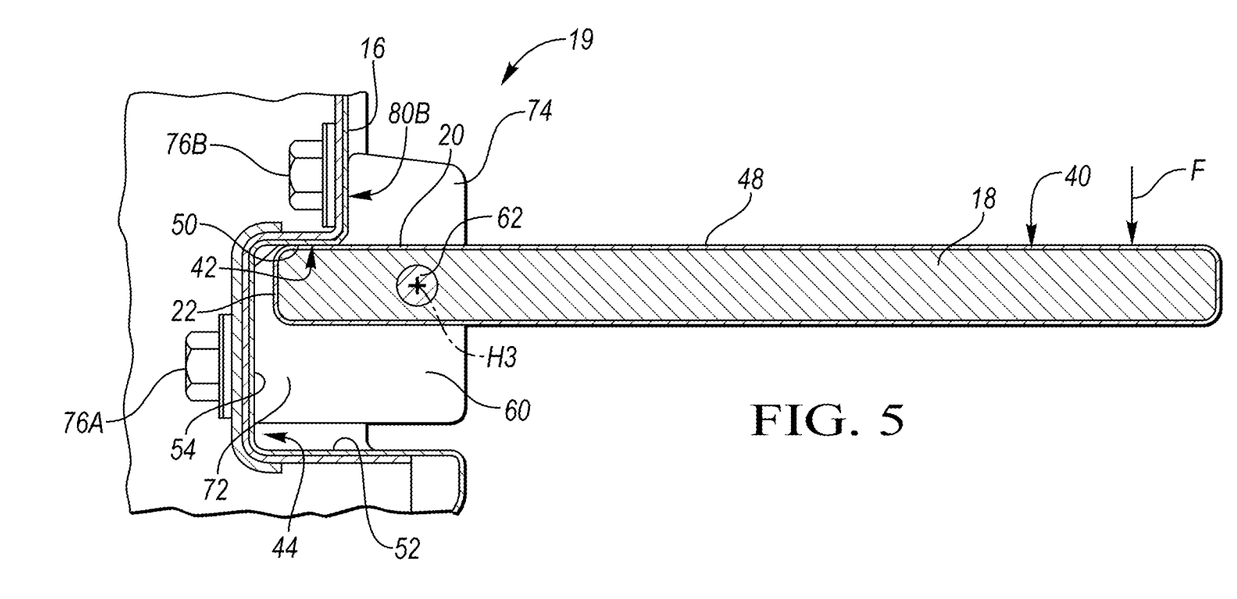
FIG. 5 is a schematic illustration in fragmentary cross-sectional view of the endgate assembly taken at lines 5-5 in FIG. 3.
Figure 6:
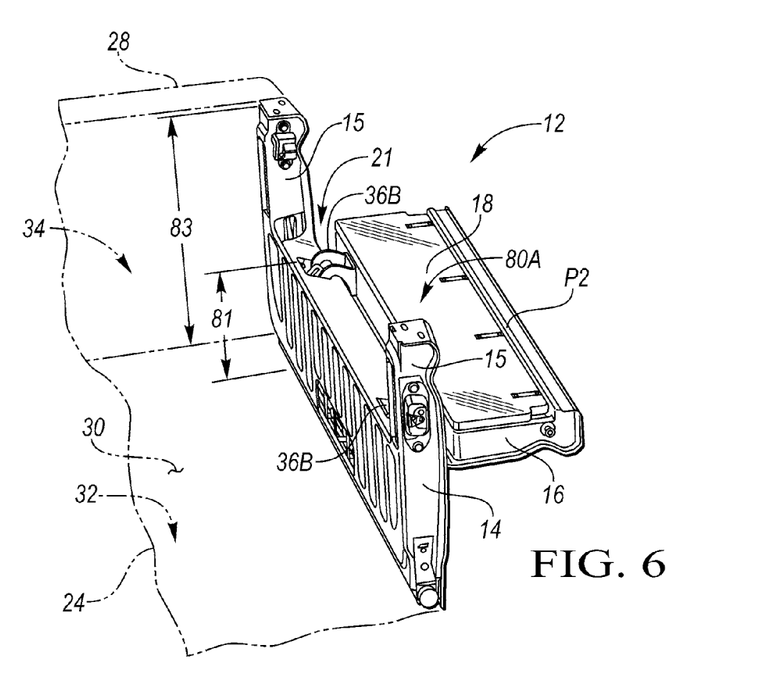
FIG. 6 is a schematic illustration in perspective view of the endgate assembly of FIG. 1 showing the body of the vehicle in partial phantom view, with the first panel in the closed position, the second panel in the second position, and the third panel in the stowed position.

Referring to the drawings, wherein like reference numbers refer to like components throughout the views, FIG. 1 shows a vehicle 10 that has a multi-hinged endgate assembly 12. As best shown in FIGS. 3 and 5 and as described herein, the endgate assembly 12 has three interconnected, pivotable panels, including a first panel 14, a second panel 16, and a third panel 18. The second and third panels 16, 18 are cooperatively configured so that the third panel 18 is supported by the second panel 16 in a use position without any latch assemblies, linkages, cables, support arms, straps, ropes, chains, struts or other components other than a hinge assembly 19 described herein. User access is thus unobstructed along the exposed portion of the third panel 18. The number of components, assembly time, and complexity of the endgate assembly 12 is also reduced. In the embodiment shown, the second panel 16 supports the third panel 18 by distributing the stress of loads applied to the third panel 18 to the second panel 14 through contact with a proximal portion 20 of the third panel 18 along a proximal edge 22 adjacent the second panel 16.

It should be understood that the panels 14, 16, 18 are not necessarily flat, nor is each necessarily a single component. For example, each panel may have an inner panel portion, an outer panel portion, and internal reinforcements. The panel 14 may also be referred to as a major gate. The panel 16 may also be referred to as a minor gate. The panel 18 may also be referred to as a step gate or step panel. The endgate assembly 12 is shown as a tailgate assembly of a pickup truck, but it may be used as an endgate on other types of vehicles as well.

Referring again to FIG. 1, the vehicle 10 has a vehicle body 24 that includes first and second sidewalls 26, 28, and a floor 30 indicated with a hidden line. The side walls 26, 28 are generally parallel with one another and perpendicular to the floor 30. The floor 30 defines a first loading surface 32. The sidewalls 26, 28, floor 30, and endgate assembly 12 partially define a cargo space 34 best shown in FIG. 10. Cargo can be stored in the cargo space such as by supporting the cargo on the first loading surface 32 of the floor 30.

Figure 2:
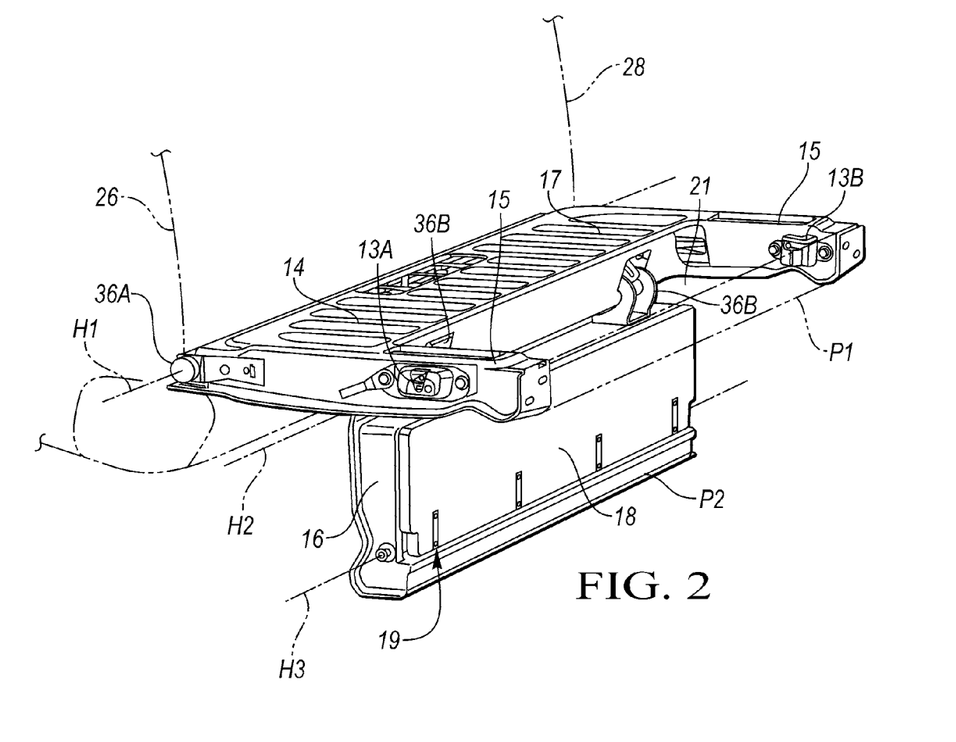
FIG. 2 is a schematic illustration in perspective of the endgate assembly of FIG. 1 showing a body of the vehicle in partial phantom view, with a first panel in an open position, a second panel in a second position, and a third panel in a stowed position.
Figure 10:
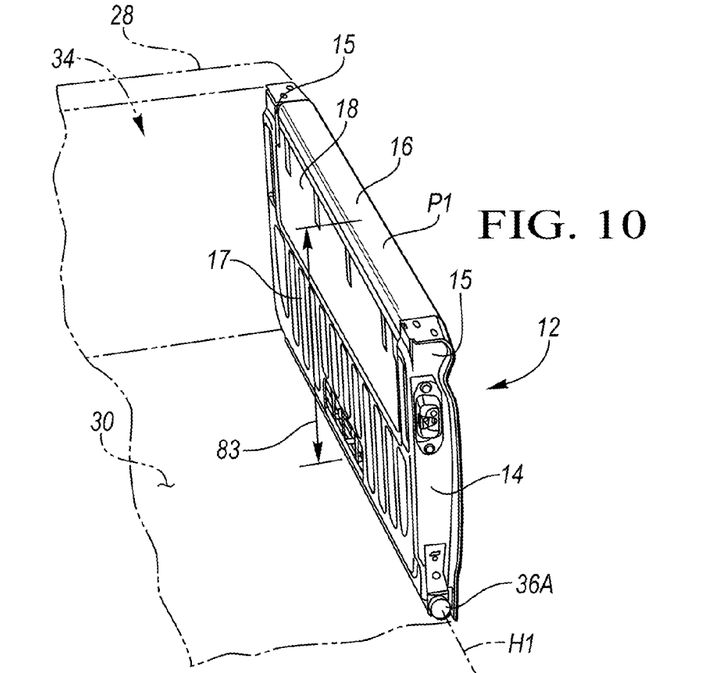
FIG. 10 is a schematic illustration in perspective view of the endgate assembly of FIG. 1 showing the body of the vehicle in partial phantom view, with the first panel in the closed position, the second panel in the first position, and the third panel in the stowed position.

In FIG. 1, the first panel 14 and second panel 16 of the endgate assembly 12 are visible. As best shown in FIGS. 2 and 10, the first panel 14 is pivotably secured to the sidewalls 26, 28 at a first hinge 36A such that the first panel 14 is pivotable about a first hinge axis H1. FIGS. 1 and 10 show the first panel 14 in a closed position. The first panel 14 is pivotable about the first hinge axis H1 from the closed position to an open position shown in FIGS. 2 and 8. As best illustrated in FIG. 2, the first panel 14 has two post portions 15 extending from a body portion 17 to define a generally U-shaped cavity 21 in which the second panel 16 is received when in a first position P1, shown in FIG. 10. Latch assemblies 13A may secure the first panel 14 to the sidewalls 26, 28 when the first panel 14 is in the closed position. One latch assembly 13A is shown secured to the side of the post 15 in FIG. 2. An identical latch assembly 13A may be secured to the other post 15 at the side of the other post 15 that is not visible in FIG. 2. To pivot the first panel 14 to the open position, an operator would first release the latch assemblies 13A. Optionally, flexible connector cables or other support devices may connect each sidewall 26, 28 to the first panel 14 to help support the first panel 14 in the open position. The first panel 14 is perpendicular to the floor 30 in the closed position, and generally parallel with the floor 30 in the open position.

The second panel 16 is hinged to the first panel 14 at second hinges 36B such that the second panel 16 is pivotable about a second hinge axis H2 that is spaced from and generally parallel with the first hinge axis H1, as shown in FIG. 2. The second panel 16 is pivotable about the second hinge axis H2 from a first position P1 shown in FIG. 1 and indicated in phantom in FIG. 2, to a second position P2 indicated in FIG. 2. Latch assemblies 13B may secure the second panel 16 to the first panel 14 in the first position P1. One latch assembly 13B is shown secured to the side of the post 15 in FIG. 2. An identical latch assembly 13B may be secured to the side of the other post 15 that is not visible in FIG. 2. To pivot the second panel 14 to the second position P2, an operator would first release the latch assemblies 13B. In the first position P1, the second panel 16 is generally parallel with the first panel 14. In the second position P2, the second panel 16 is generally perpendicular to the first panel 14, as indicated in FIG. 2.

Figure 4:
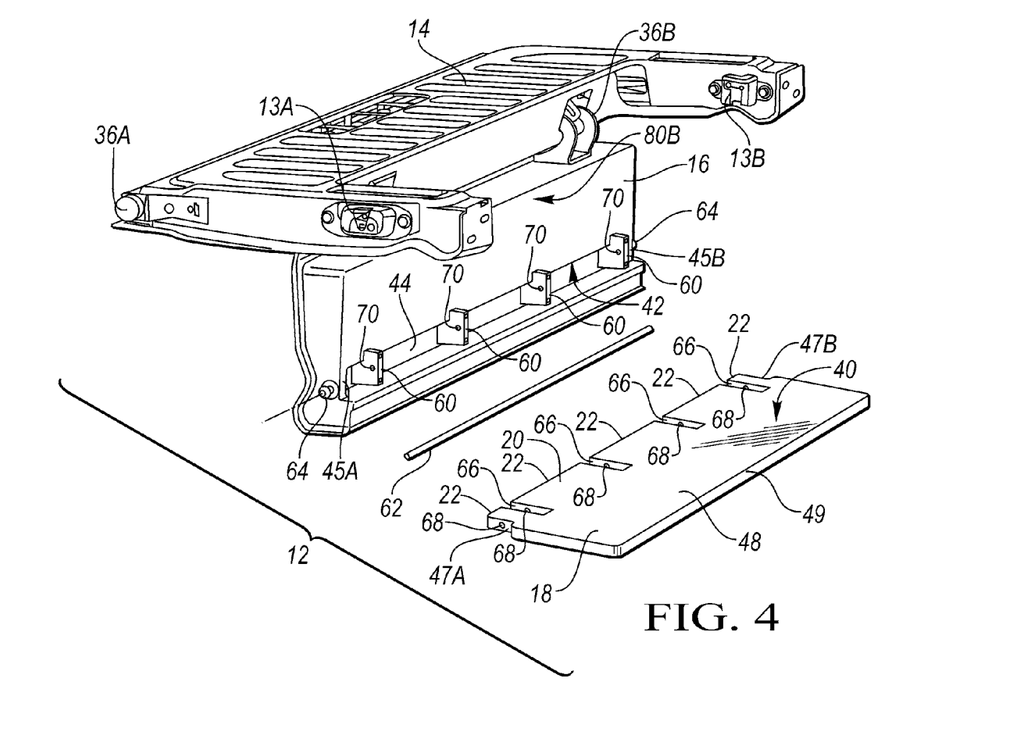
FIG. 4 is a schematic illustration in exploded view of the endgate assembly of FIG. 3.

The third panel 18 is hinged to the second panel 16 with a hinge assembly 19 such that the third panel 18 is pivotable about a third hinge axis H3 from a stowed position (shown in FIG. 2) in which the third panel 18 is generally parallel with the second panel 16, to a use position (shown in FIG. 3) in which the third panel 18 is generally perpendicular to the second panel 16. When the endgate assembly 12 is in the configuration shown in FIG. 3, with the first panel 14 in the open position, the second panel 16 in the second position, and the third panel 18 in the use position, the third panel 18 can be used as a step to access the cargo space 34. In other words, a load F, such as a person's weight, can be applied to a loading surface 40, which is an upward-facing surface when the endgate assembly 12 is in the configuration of FIG. 2. The third panel 18 is secured to the second panel 16 only by the hinge assembly 19, which is best shown in FIGS. 4 and 5. Because the third panel 18 is pivotable relative to the hinge assembly 19, the load F applied to the third panel 18 must be borne by the second panel 16. To accomplish this, the second panel 16, the third panel 18, and the hinge assembly 19 are cooperatively configured to maintain the third panel 18 in the use position while reacting the load F at a first surface 42 of the second panel 16, shown in FIG. 5. The force reacted by the second panel 16 at the first surface 42 will depend upon the distance of the load F from the third hinge axis H3. Because a distal portion 48 of the third panel 18 extends further from the third hinge axis H3 than the proximal portion 20 does, the reaction force of the second panel 16 on the proximal portion 20 will be greater than the force F, assuming the force F is positioned further from the third hinge axis H3 than the proximal edge 22 is from the third hinge axis H3.

More specifically, as shown in FIG. 5, the second panel 16 is configured with a recess 44 that is generally U-shaped in cross-section taken through the third hinge axis H3. As shown in FIG. 4, the recess 44 extends nearly the entire width of the second panel 16 (i.e., transversely on the vehicle 10), with end walls 45A, 45B of the second panel 16 defining terminal ends of the recess 44. The third panel 18 has notched corners 47A, 47B at the proximal edge 22 so that the proximal portion 20 fits within the recess 44. The third panel 18 is wider at a distal edge 49 at which the corners of the third panel 18 are not notched. The proximal portion 20 and the distal portion 48 that are divided by the third hinge axis H3. In other words, the proximal portion 20 extends from the proximal edge 22 of the third panel 18 (i.e., the edge nearest the second panel 16 when the third panel 18 is in the use position) to the hinge axis H3, while the distal portion 48 extends from the distal edge 49 of the third panel 18 (i.e., the edge furthest from the second panel 16 when the third panel 18 is in the use position) to the hinge axis H3.

With reference to FIGS. 3 and 4, the recess 44 is adjacent the third hinge axis H3 and receives the proximal portion 20 when the third panel 18 is pivoted to the use position. The recess 44 has a general U-shape in a cross-section taken perpendicular to the third hinge axis H3. In other words, as shown in FIG. 5, the recess 44 has three sides including a first side 50, an opposite second side 52, and a third side 54 that connects the sides 50 and 52. The first surface 42 of the second panel 16 is the surface of the first side 50 in the recess 44. The first surface 42 is positioned to establish the use position of the third panel 18 by contacting the proximal portion 20 and reacting a load on the distal portion 48 (i.e., reacting load F). By contacting the proximal portion 20 in this manner and reacting the load F, the first surface 42 of the second panel 16 acts as a reaction surface and prevents further pivoting of the third panel 18 about the third hinge axis H3 in the direction from the stowed position to the use position. The recess 44 is sufficiently large so that the third panel 18 does not contact the second side 52 or the third side 54 when pivoting to the use position.

FIGS. 4 and 5 show that the hinge assembly 19 includes hinge blocks 60 that are fixed to the second panel 16 and extend into the recess 44. In the embodiment shown, the hinge assembly 19 has four separate hinge blocks 60 spaced from one another along the hinge axis H3. In other embodiments, only a single hinge block 60 could be used, or two, three, or more than four hinge blocks 60 could be used. For example, if a single hinge block 60 were used, it may be wider than the hinge blocks 60 shown to extend further transversely (i.e., along the width of the recess 44). The hinge assembly 19 is pivotably anchored at the end walls 45A, 45B of the second panel 16. The hinge assembly also includes a hinge rod 62 that extends through the third panel 18, through the hinge blocks 60, and through the end walls 45A, 45B. End caps 64 cover and contain the ends of the hinge rod 62. The third hinge axis H3 extends through the center of the hinge rod 62, along a length of the hinge rod 62, as indicated in FIG. 5. As is apparent in FIG. 4, the third panel 18 has cavities 66 in the proximal portion 20 that are spaced from one another in conformance with the spacing of the hinge blocks 60 so that each cavity 66 contains a respective one of the hinge blocks 60 when the endgate assembly 12 is assembled. A hole 68 extends transversely through the proximal portion 20 and aligns with holes 70 extending through each hinge block 60. The holes 68, 70 are sized to receive the hinge rod 62, thereby securing the third panel 18 to the second panel 16 via the hinge assembly 19.

As best shown in FIG. 5, each hinge block 60 has a first leg 72 and a second leg 74 arranged in an L-shape. The first leg 70 extends into the recess 44 and is secured to the second panel 16 in the recess 44. A bolt 76A extends through the second panel 16 and into the first leg 72 to secure the hinge block 60 to the second panel 16 in the recess 44. The second leg 74 extends along the second panel 16 outside of the recess 44. In other words, the second leg 74 extends along an outer surface 80B of the second panel 16 (also referred to herein as a second loading surface) and is secured to the second panel 16 outside of the recess 44. A bolt 76B extends through the second panel 16 and into the second leg 74 to secure the hinge block 60 to the second panel 16 outside of the recess 44. Accordingly, the hinge block 60 has a contoured shape established by the first leg 72 and the second leg 74. The contoured shape of the hinge block 60 allows the hinge block 60 to abut the second panel 16 both in the recess 44 and outside of the recess 44 and be secured to the second panel 16 both in the recess 44 and outside of the recess 44. This interfitting of the hinge blocks 60 and the second panel 16 stabilizes the position of the third hinge axis H3 and the use position of the third panel 18 relative to the first surface 42 of the second panel 16 that acts as the reacting surface.

Figure 7:
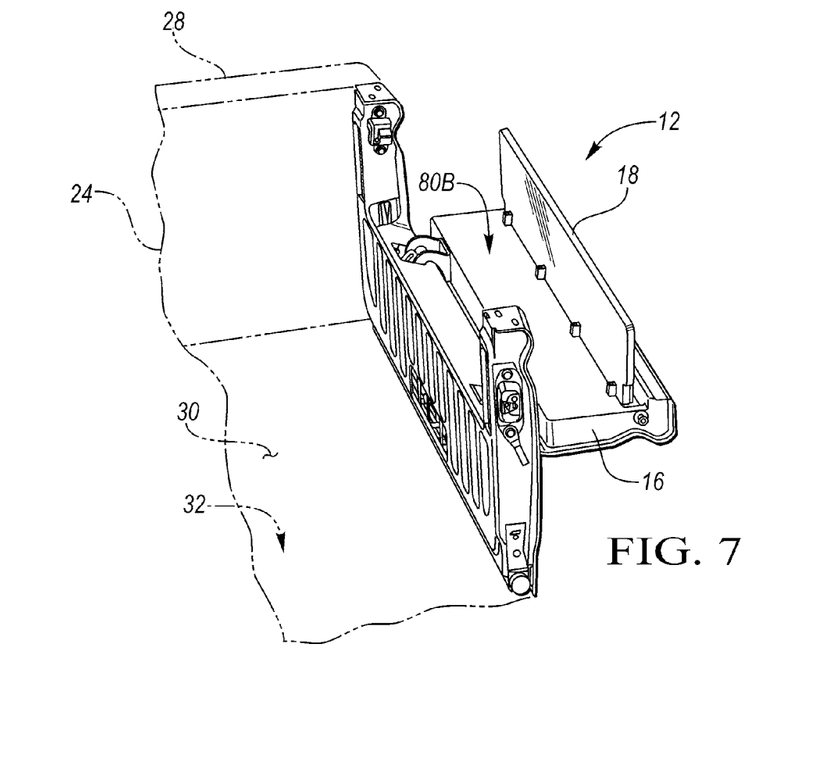
FIG. 7 is a schematic illustration in perspective view of the endgate assembly of FIG. 1 showing the body of the vehicle in partial phantom view, with the first panel in the closed position, the second panel in the second position, and the third panel in the use position.

As indicated in FIGS. 6-11, the endgate 12 can establish many configurations in addition to that shown in FIG. 2. For example, in FIG. 6, the first panel 14 is in the closed position, the second panel 16 is in the second position P2, and a third panel 18 is in the stowed position. The height 81 of the first panel 14 is less in the center, at the U-shaped cavity 21, than the height 83 at the posts 15. Access to the cargo space 34 from outside of the vehicle 10, across the center of the first panel 14, is thus easier with the second panel 16 in the second position. The body 24 of the vehicle 10 is shown in partial phantom view, with the sidewall 28 and the floor 30. In this configuration, the third panel 18 defines a second loading surface 80A spaced from the first loading surface 32 and outward of the first panel 14 away from the floor 30. Two-tier loading is thus enabled, as some cargo can be supported on the floor 30, while other cargo can be supported on the surface 80A. The hinges 36B are configured to stop pivoting of the second panel 16 at the second position P2 shown. FIG. 7 shows that the third panel 18 can be pivoted to the use position, with the first panel 14 remaining in the closed position and the second panel 16 remaining in the second position P2. This enables the third panel 18 to function as a terminal end wall, i.e., as a stop for cargo that can be supported on the second panel 16. In this configuration, the second panel 16 provides a second loading surface 80B generally parallel to and spaced from the first loading surface 32.

Figure 8:
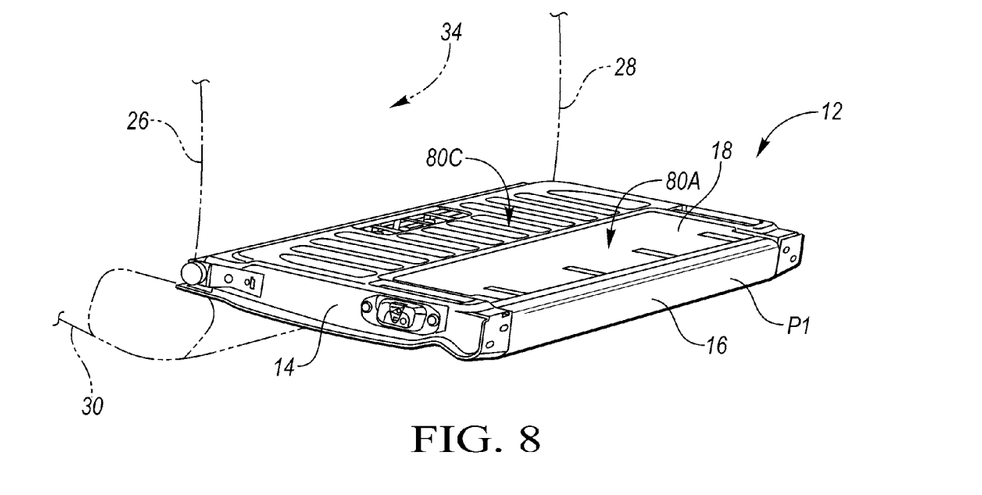
FIG. 8 is a schematic illustration in perspective view of the endgate assembly of FIG. 1 showing the body of the vehicle in partial phantom view, with the first panel in the open position, the second panel in the first position, and the third panel in the stowed position.
Figure 9:
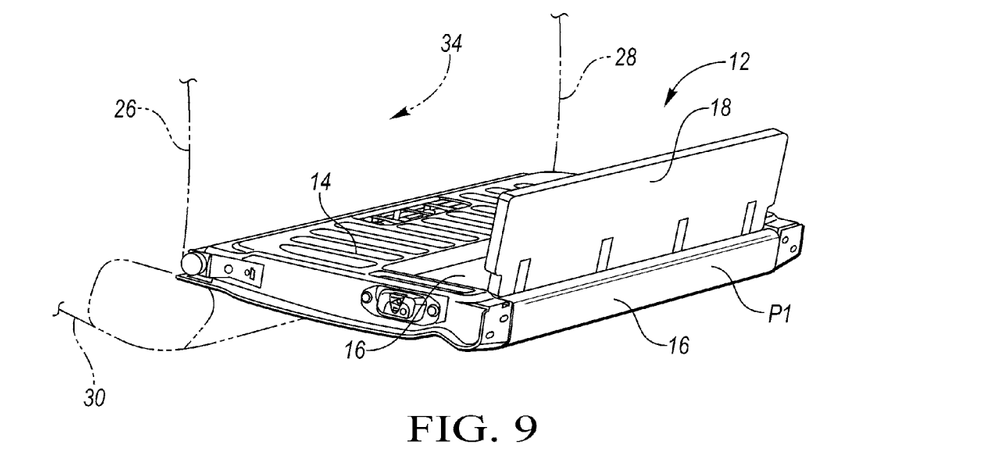
FIG. 9 is a schematic illustration in perspective view of the endgate assembly of FIG. 1 showing the body of the vehicle in partial phantom view, with the first panel in the open position, the second panel in the first position, and the third panel in the use position.

FIG. 8 shows the first panel 14 pivoted to the open position, the second panel 16 in the first position P1 and the third panel 18 in the stowed position. In this configuration, the first panel 14 provides a third loading surface 80C along with the second loading surface 80A of the third panel 18, both of the loading surfaces 80A, 80C being generally parallel to and level with the floor 30 so that the endgate assembly 12 extends the loading surface 32 of the floor 30. FIG. 9 shows that the third panel 18 can be pivoted to the use position with the first panel 14 remaining in the open position, parallel to and generally flush with the floor 30, and the second panel 16 remaining in the first position P1. This enables the third panel 18 to function as a terminal end wall, i.e., as a stop for cargo that can be supported on the floor 30, the first panel 14, and the second panel 16.

Figure 11:
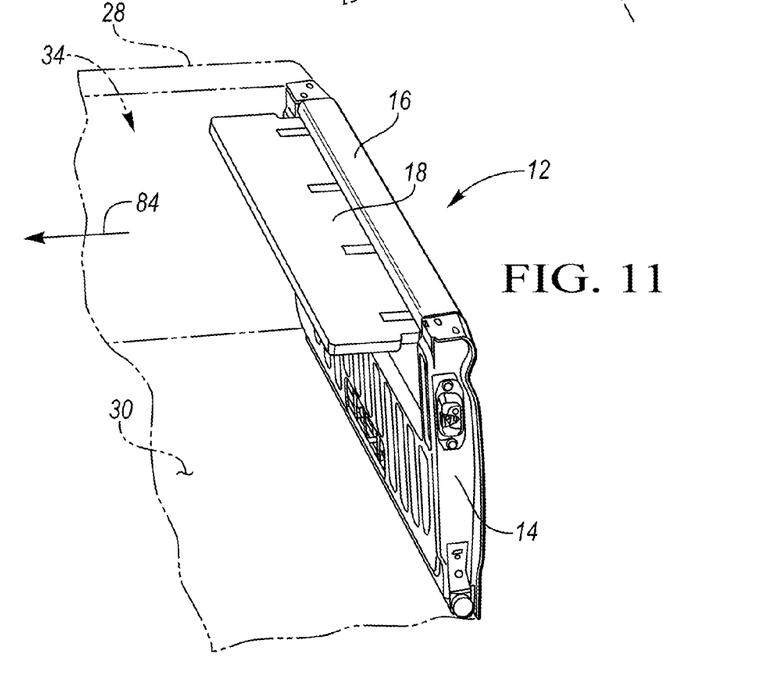
FIG. 11 is a schematic illustration in perspective view of the endgate assembly of FIG. 1 showing the body of the vehicle in partial phantom view, with the first panel in the closed position, the second panel in the first position, and the third panel in the use position.

FIG. 10 shows the first panel 14 in the closed position, the second panel 16 in the first position P1 and the third panel 18 in the stowed position. In this configuration, the endgate assembly 12 further encloses and defines the cargo area 34 with the floor 30 and the sidewalls (only sidewall 28 shown in phantom in FIG. 10). The endgate assembly 12 is also in this configuration in FIG. 1. In this configuration, the overall height 83 of the endgate assembly 12 above the floor 30 is the same as the height of the endposts 15. In other words, the multiple hinges H1, H2, H3 and panels 14, 16, 18 are configured so that the overall height 83 of the endgate assembly 12 is not increased by the presence of the second panel 16 and the third panel 18. From this configuration, the third panel 18 can be pivoted to the use position, as shown in FIG. 11, so that the third panel 18 is directly above the floor 30 and generally parallel to the floor 30. In this configuration, the third panel 18 may reduce airflow into the cargo area 34, thereby reducing aerodynamic drag on the vehicle 10 when the vehicle 10 moves in a forward direction indicated by arrow 84.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An endgate assembly for connection to a vehicle body comprising:
    a first panel having a first hinge axis;
    a second panel hinged to the first panel at a second hinge axis that is spaced from and generally parallel with the first hinge axis; wherein the second panel is pivotable about the second hinge axis from a first position generally parallel with the first panel to a second position generally perpendicular to the first panel;

a third panel hinged to the second panel at a third hinge axis and pivotable about the third hinge axis from a stowed position generally parallel with the second panel to a use position generally perpendicular to the second panel; wherein the third panel has a proximal portion and a distal portion; wherein the proximal portion and the distal portion are divided by the third hinge axis;

wherein the second panel has a recess adjacent the third hinge axis that receives the proximal portion when the third panel is pivoted to the use position; and wherein the second panel has a first surface at the recess positioned to establish the use position of the third panel by contacting the proximal portion and reacting loading of the distal portion, thereby preventing further pivoting of the third panel about the third hinge axis; and a hinge assembly including:
  at least one hinge block fixed to the second panel and extending into the recess; and
  a hinge rod extending through the third panel and said at least one hinge block; wherein the third hinge axis extends along a length of the hinge rod.

2. The endgate assembly of claim 1, wherein the second panel is connected to the third panel only by the hinge assembly.

3. The endgate assembly of claim 1, wherein said at least one hinge block includes multiple hinge blocks spaced from one another along the third hinge axis;
  wherein the third panel has cavities in the proximal portion that are spaced from one another and each containing a respective one of the hinge blocks.

4. The endgate assembly of claim 1, wherein said at least one hinge block has a first leg and a second leg arranged in an L-shape; wherein the first leg extends into the recess and is secured to the second panel in the recess; and wherein the second leg extends along the second panel outside of the recess and is secured to the second panel outside of the recess.

5. The endgate assembly of claim 1, wherein the third panel has notched corners at the proximal portion.

6. The endgate assembly of claim 1, wherein the recess is a generally U-shaped channel and the first surface of the second panel contacts a loading surface of the third panel.

7. An endgate assembly for connection to a vehicle body comprising:
  a first panel having a first hinge axis;
  a second panel hinged to the first panel at a second hinge axis that is spaced from and generally parallel with the first hinge axis; wherein the second panel is pivotable about the second hinge axis from a first position generally parallel with the first panel to a second position generally perpendicular to the first panel;
  a third panel hinged to the second panel at a third hinge axis and pivotable about the third hinge axis from a stowed position generally parallel with the second panel to a use position generally perpendicular to the second panel; wherein the third panel has a proximal portion and a distal portion; wherein the proximal portion and the distal portion are divided by the third hinge axis;
  wherein the second panel has a recess adjacent the third hinge axis that receives the proximal portion when the third panel is pivoted to the use position; and wherein the second panel has a first surface at the recess positioned to establish the use position of the third panel by contacting the proximal portion and reacting loading of the distal portion, thereby preventing further pivoting of the third panel about the third hinge axis;
  a hinge assembly including:
    at least one hinge block fixed to the second panel and extending into the recess; and
    a hinge rod extending through the third panel and said at least one hinge block; wherein the third hinge axis extends along a length of the hinge rod;
  wherein said at least one hinge block has a contoured shape that abuts the second panel in the recess and outside of the recess and is secured to the second panel in the recess and outside of the recess; and
  wherein the recess is a generally U-shaped channel and the first surface of the second panel contacts a loading surface of the third panel.

8. The endgate assembly of claim 7, wherein the second panel is connected to the third panel only by the hinge assembly.

9. The endgate assembly of claim 7, wherein said at least one hinge block includes multiple hinge blocks spaced from one another along the third hinge axis;
  wherein the third panel has cavities in the proximal portion that are spaced from one another and each containing a respective one of the hinge blocks.

10. The endgate assembly of claim 7, wherein said at least one hinge block has a first leg and a second leg arranged in an L-shape; wherein the first leg extends into the recess and is secured to the second panel in the recess; and wherein the second leg extends along the second panel outside of the recess and is secured to the second panel outside of the recess.

11. The endgate assembly of claim 7, wherein the third panel has notched corners at the proximal portion.

12. A vehicle comprising:
  a vehicle body including vehicle sidewalls and a floor;
  an endgate assembly including:
    a first panel hinged to the floor at a first hinge axis to at least partially define a cargo space with the vehicle sidewalls and the floor; wherein the first panel is pivotable about the first hinge axis between a closed position than at least partially encloses the cargo space and an open position that at least partially permits access to the cargo space;
    a second panel hinged to the first panel at a second hinge axis and pivotable about the second hinge axis from a first position in which the second panel is generally parallel with the first panel to a second position in which the second panel is generally perpendicular to the first panel;
    a third panel hinged to the second panel and pivotable about a third hinge axis between a stowed position in which the third panel is generally parallel with the second panel and a use position in which the third panel extends generally perpendicular to the second panel;
    a hinge assembly including:
      at least one hinge block fixed to the second panel and extending into the recess; and
      a hinge rod extending through the third panel and said at least one hinge block; wherein the third hinge axis extends along a length of the hinge rod;
    wherein the third panel has a proximal portion and a distal portion; wherein the proximal portion and the distal portion are divided by the third hinge axis;

wherein the second panel has a recess adjacent the third hinge axis that receives the proximal portion when the third panel is pivoted to the use position; and wherein the second panel has a first surface at the recess positioned to establish the use position of the third panel by contacting the proximal portion and reacting loading of the distal portion, thereby preventing further pivoting of the third panel about the third hinge axis.

13. The vehicle of claim 12, wherein the second panel is generally parallel with the floor when the first panel is in the closed position and the second panel is in the second position, the floor defining a first loading surface and the third panel defining a second loading surface spaced from the first loading surface and extending outward from the first panel away from the floor.

14. The vehicle of claim 13, wherein the first panel extends generally parallel to and generally flush with the floor in the open position to extend the first loading surface and the third panel functions as a terminal end wall when the first panel is in the open position and the third panel is in the use position.

15. The vehicle of claim 12, wherein the third panel is in the use position and extends outward from the second panel away from the vehicle body to function as a step for accessing the cargo space when the first panel is in the open position and the second panel is in the second position; wherein loading on an upward-facing surface of the third panel is reacted by the first surface of the second panel when the third panel functions as the step.

16. The vehicle of claim 12, wherein the third panel extends generally parallel to the floor and directly above the floor with the first panel in the closed position, the second panel in the first position, and the third panel in the use position.

17. The vehicle of claim 12, wherein the second panel is connected to the third panel only by the hinge assembly.

18. The vehicle of claim 12, wherein said at least one hinge block includes multiple hinge blocks spaced from one another along the third hinge axis;
wherein the third panel has cavities in the proximal portion that are spaced from one another and each containing a respective one of the hinge blocks.

19. The vehicle of claim 12, wherein said at least one hinge block has a first leg and a second leg arranged in an L-shape; wherein the first leg extends into the recess and is secured to the second panel in the recess; and wherein the second leg extends along the second panel outside of the recess and is secured to the second panel outside of the recess.

20. The vehicle of claim 12, wherein the recess is a generally U-shaped channel and the first surface of the second panel contacts a loading surface of the third panel.

* * * * *